United States Patent [19]
Nelson, Jr.

[11] Patent Number: 6,109,529
[45] Date of Patent: *Aug. 29, 2000

[54] BAR CODE IDENTIFICATION AND RECORD ASSEMBLY

[76] Inventor: George N. Nelson, Jr., 1777 Knox Ave. South, Minneapolis, Minn. 55403

[ * ] Notice: This patent issued on a continued prosecution application filed under 37 CFR 1.53(d), and is subject to the twenty year patent term provisions of 35 U.S.C. 154(a)(2).

[21] Appl. No.: 08/852,182

[22] Filed: May 6, 1997

[51] Int. Cl.⁷ .................................................. G06K 19/00
[52] U.S. Cl. ........................................... 235/487; 235/384
[58] Field of Search .................................. 235/487, 488, 235/462, 384, 385, 449, 462.01

[56] References Cited

U.S. PATENT DOCUMENTS

| | | | |
|---|---|---|---|
| 3,445,633 | 5/1969 | Ratner | 235/487 |
| 3,622,995 | 11/1971 | Hopskin et al. | 235/382 |
| 4,114,151 | 9/1978 | Denne et al. | 343/6.8 LC |
| 4,129,855 | 12/1978 | Rodrian | 340/152 T |
| 4,208,795 | 6/1980 | Mühlemann et al. | 433/203 |
| 4,262,632 | 4/1981 | Hanton et al. | 119/1 |
| 4,325,146 | 4/1982 | Lennington | 455/604 |
| 4,364,043 | 12/1982 | Cole et al. | 340/825.54 |
| 4,459,590 | 7/1984 | Saulnier | 340/825.54 |
| 4,463,353 | 7/1984 | Kuzara | 340/825.54 |
| 4,463,706 | 8/1984 | Meister et al. | 119/51 |
| 4,475,481 | 10/1984 | Carroll | 119/51 |
| 4,535,557 | 8/1985 | Porcher | 40/300 |
| 4,634,849 | 1/1987 | Klingen | 235/487 |
| 4,711,994 | 12/1987 | Greenberg | 235/375 |
| 4,785,563 | 11/1988 | Friedman | 40/300 |
| 4,829,558 | 5/1989 | Welsh | 379/92 |
| 4,854,328 | 8/1989 | Pollack | 128/736 |
| 4,857,893 | 8/1989 | Carroll | 340/572 |
| 5,028,918 | 7/1991 | Giles et al. | 340/825.54 |
| 5,041,826 | 8/1991 | Milheiser | 340/825.54 |
| 5,150,114 | 9/1992 | Johansson | 340/825.54 |
| 5,339,051 | 8/1994 | Koehler et al. | 331/65 |
| 5,358,514 | 10/1994 | Schulman et al. | 607/61 |
| 5,499,626 | 3/1996 | Willham et al. | 128/630 |
| 5,504,321 | 4/1996 | Sheldon | 235/492 |
| 5,511,553 | 4/1996 | Segalowitz | 128/696 |
| 5,519,200 | 5/1996 | Williams | 235/487 |
| 5,525,991 | 6/1996 | Nagura et al. | 342/42 |
| 5,587,575 | 12/1996 | Leitner et al. | 235/384 |
| 5,621,203 | 4/1997 | Swartz et al. | 235/462 |
| 5,621,204 | 4/1997 | Yu | 235/462 |
| 5,621,647 | 4/1997 | Kraemer et al. | 364/468.22 |
| 5,623,347 | 4/1997 | Pizzanelli | 359/2 |

*Primary Examiner*—Thien M. Le
*Assistant Examiner*—Daniel St. Cyr
*Attorney, Agent, or Firm*—Faegre & Benson LLP

[57] ABSTRACT

A bar code identification record assembly suitable for associating an identification code with a code recipient and for maintaining an independent record of the identification code associated with the code recipient. The assembly includes a carrier element, a patch, and a data record. The patch is releasably disposed on the carrier element. The patch is provided with an adhesive coating, such that the patch is adherable to the code recipient after the patch is removed from the carrier element. The patch also comprises a bar code image which stores information comprising the identification code. The bar code image can be remotely interrogated to obtain the identification code. The data record is disposed on the carrier element at a position separate from the patch such that the data record is retained on at least a portion of the carrier element after the patch is removed from the carrier element. The data record includes information which comprises a copy of the identification code such that, after the patch is removed from the carrier element and adhered to the code recipient, the carrier element bearing the data record can be separately stored. The separately stored carrier element thereby provides a tangible separate record of the identification code associated with the code recipient. If desired, the information can also be transferred to and stored in a computer database.

43 Claims, 5 Drawing Sheets

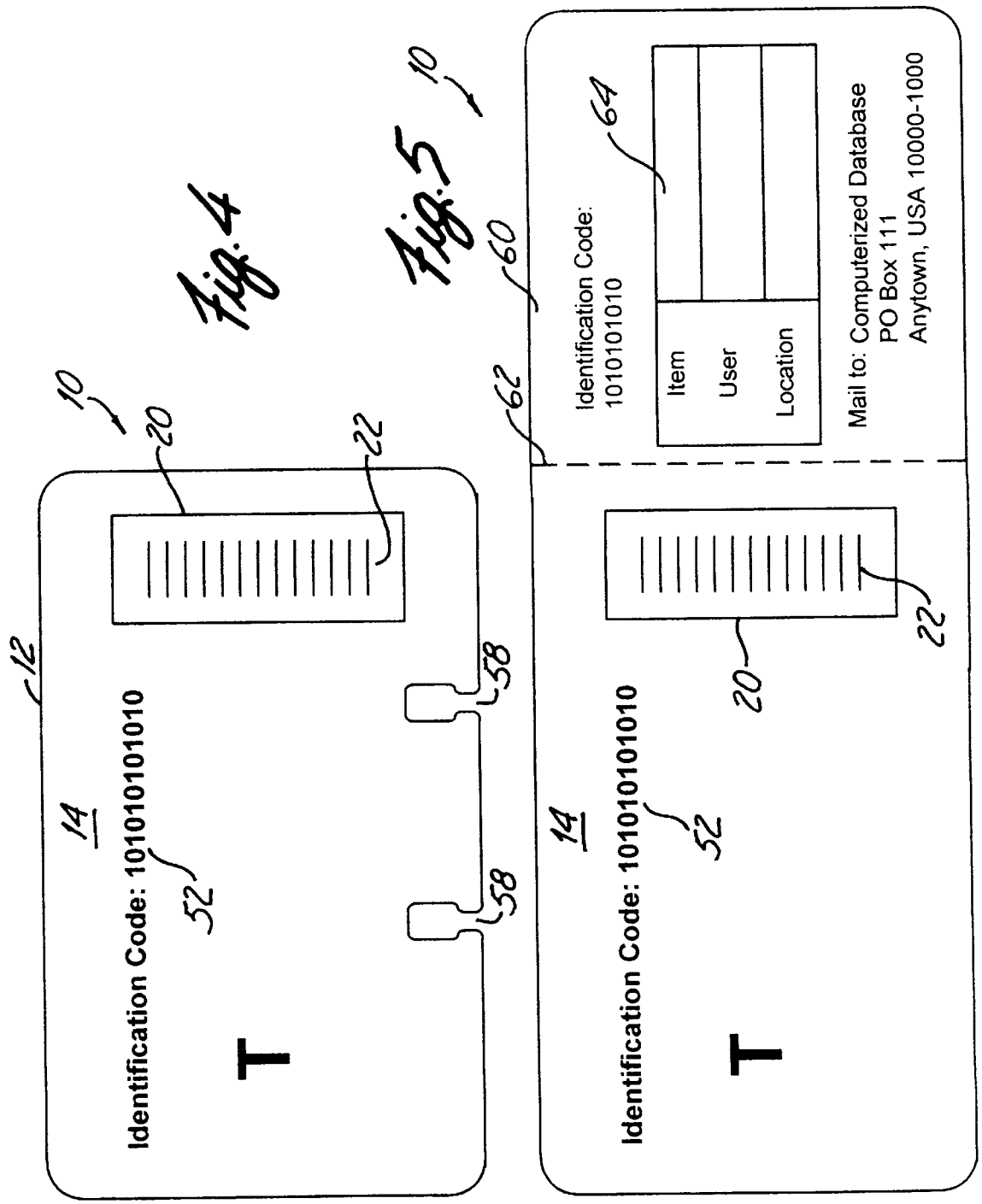

BAR CODE IDENTIFICATION AND RECORD ASSEMBLY

FIELD OF THE INVENTION

This invention relates to an assembly for associating a code recipient, such as an object, animal, or human, with a unique identification code. More specifically, this invention relates to such an assembly in which the unique identification code is stored in a bar code format.

BACKGROUND OF THE INVENTION

Bar code symbols are formed from bars or elements that are typically rectangular in shape with a variety of possible widths. The specific arrangement of these elements defines a character according to a set of rules and definitions specified by the code or symbology used. The relative size of the bars and spaces is determined by the type of coding used, as is the actual size of the bars and spaces. The number of characters per inch represented by the bar code symbol is referred to as the density of the symbol. To encode a desired sequence of characters, groups of elements are concatenated together to form the complete bar code symbol, with each character of the message being represented by its own corresponding group of elements. In some symboligies, unique start and stop characters are used to indicate where the bar code begins and ends. A number of different bar code symboliges exist. These symboliges include, for example, UPC/EAN, code 39, code 49, code 128, code-a-bar, and interleave 205.

Bar codes, however, are not limited to the use of only rectangular shapes. Any form of symbol in which different portions of the symbol have different light reflecting characteristics can be used.

Bar codes are typically scanned to transform the graphic symbol elements into electrical signals, which are then decoded into characters. A scanning system uses a light source, typically a laser, which is directed to the symbol or bar code by a lens or other optical components. The scanner functions by repetitively scanning the light beam in a path or series of paths across the symbol. Scanning systems also include a sensor or photo detector which detects light reflected from the symbol. A portion of the reflected light is detected and converted into an electrical signal, and electronic circuitry or software decodes the electrical signal into a digital representation. The symbol is decoded according to the coding technique used.

A bar code offers several advantages or other data representations. For example, a bar code allows data to be entered into a computer more rapidly. Bar code systems are nearly error-free. Bar code formats also are designed with various forms of error checking built into the code. Bar code systems are described in U.S. Pat. Nos. 5,621,203; 5,621,204; 5,621,647; and 5,623,347.

It is often desirable to assign a unique identification code to a particular object or entity while also creating a separate database record corresponding to the item or entity which contains information concerning the item or entity. To facilitate the use of such records, the records may be correlated to the identification code so that the code can be used to access the record easily. Typically, such records are created separately from the step of attaching the identity tag to the object. Such an approach may be acceptable if only a few items are to be tagged, but can become more laborious as the number of items to be tagged increases. Additionally, creating records in a separate step increases the chances of errors occurring when correlating the record to the corresponding identification code. It would be desirable if a unique identification code can be associated with an object or entity while simultaneously creating a separate record of the association.

SUMMARY OF THE INVENTION

The present invention advantageously allows the rapid association between code recipients and bar identification codes and the simultaneous creation of separate tangible records of the associations. In the practice of the present invention, the separate tangible records desirably also include substantive information relating to the code recipient so that the identification code can be used to obtain and update information concerning the code recipient as desired. According to the present invention, a "code recipient" is any item or entity to which an identification code is assigned. Code recipients could include humans, animals, and inanimate objects such as household items, business items, and the like. The present invention also facilitates automated security in order to help and protect properties from being stolen. The present invention also assists in recovery of lost or stolen items.

In one aspect, the present invention provides a bar code identification record assembly suitable for associating an identification code with a code recipient and for maintaining an independent record of the identification code associated with the code recipient. The assembly includes a carrier element, a patch, and a data record. The patch is releasably disposed on the carrier element. The patch is provided with an adhesive coating, such that the patch is adherable to the code recipient after the patch is removed from the carrier element. The patch also comprises a bar code image which stores information comprising the identification code. The bar code image can be remotely interrogated to obtain the identification code. The data record is disposed on the carrier element at a position separate from the patch. The data record includes information which comprises a copy of the identification code such that, after the patch is removed from the carrier element and adhered to the code recipient, the carrier element bearing the data record can be separately stored. The separately stored carrier element thereby provides a tangible separate record of the identification code associated with the code recipient.

In another aspect, the present invention relates to a method of providing a system suitable for associating the identification code with a code recipient while simultaneously maintaining an independent record of the identification code associated with the code recipient. In a first step an identification system is provided which includes a carrier element, a patch, and a data record as defined above. The patch is removed from the carrier element and adhered to the code recipient. The carrier element is then stored in a location separate from the code recipient to thereby provide a separate record of the identification code associated with the code recipient.

The present invention also relates to a method of providing a centralized system suitable for associating a plurality of identification codes with a plurality of corresponding code recipients and for maintaining a record of which identification code is associated with each code recipient. First, an identification system is provided which comprises a carrier element, a patch, and a data record as defined above. The patch is removed from the carrier element and adhered to the code recipient. A code recipient record is then inputted into a data base in a manner such that the identification code can be used to access the record.

BRIEF DESCRIPTION OF THE DRAWINGS

The above mentioned and other advantages of the present invention, and the manner of attaining them, will become more apparent and the invention itself will be better understood by reference to the following description of the embodiments of the invention taken in conjunction with the accompanying drawings, wherein:

FIG. 1b is a bottom plan view of the transponder identification and record assembly of FIG. 1a.

FIG. 3b is a bottom plan view of the embodiment of FIG. 3a.

FIG. 4 is a top plan view of an alternative embodiment of an identification and record assembly of the present invention.

FIG. 5 is a top plan view of an alternative embodiment of the present invention in which a detachable coupon portion is attached to the carrier element.

DETAILED DESCRIPTION OF THE PRESENTLY PREFERRED EMBODIMENTS

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

Figure 1A:
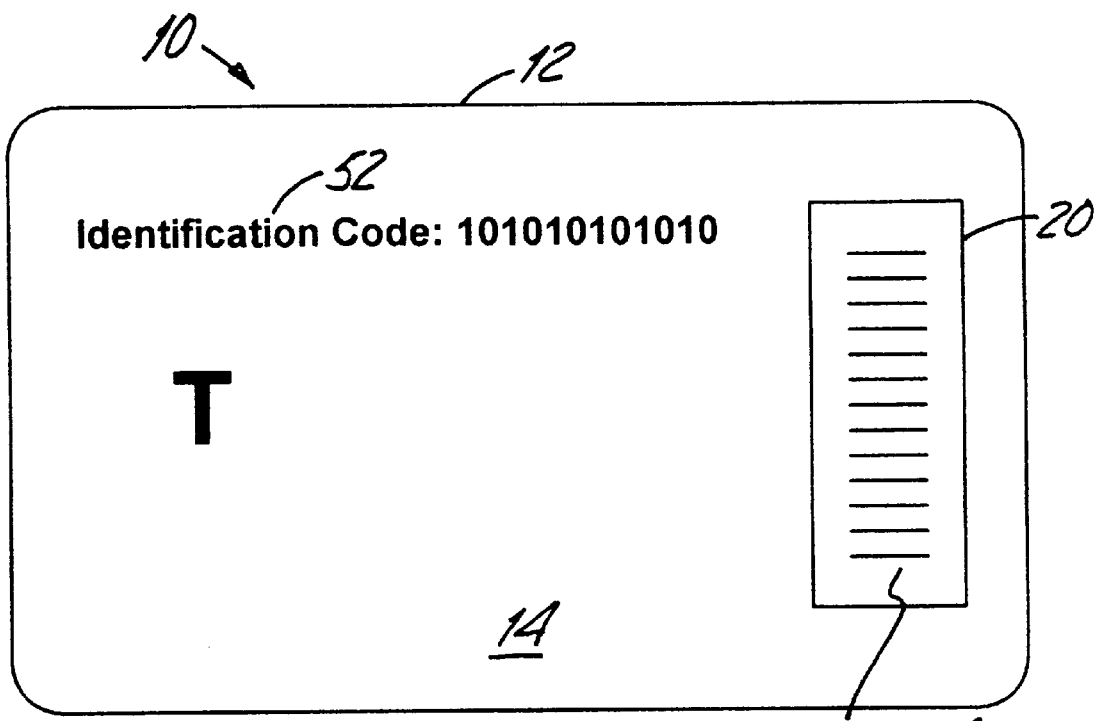
FIG. 1a is a top plan view of a bar code identification and record assembly of the present invention.
Figure 1B:
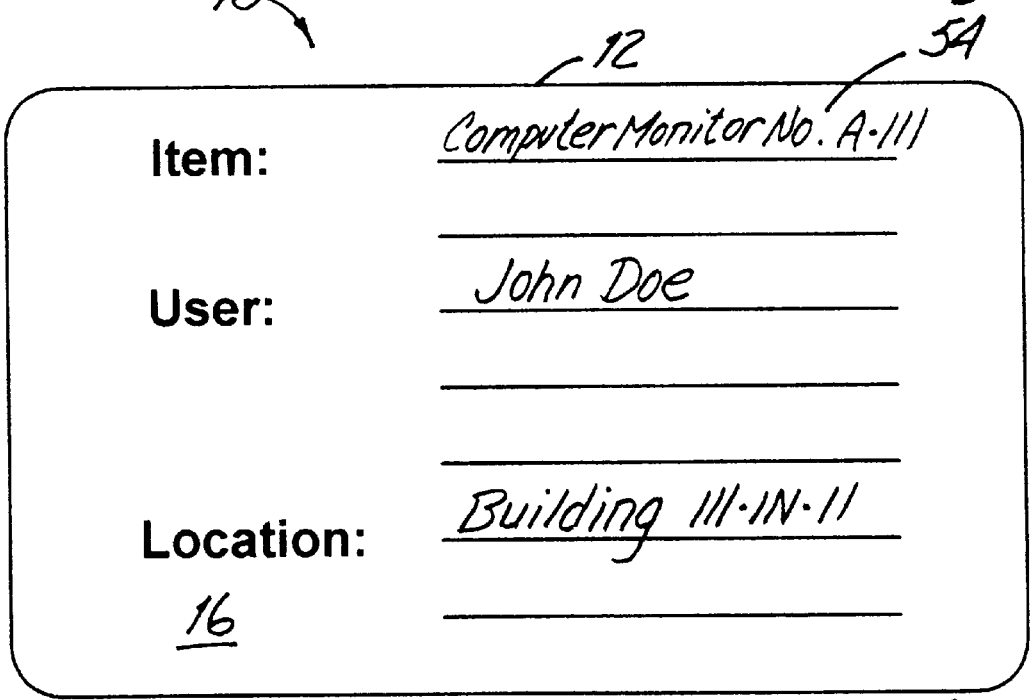
Figure 1C:
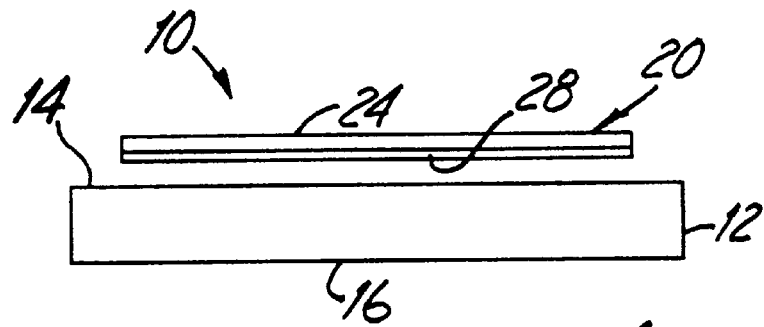
FIG. 1c is a side cross section view of the bar code identification and record assembly of FIGS. 1a and 1b.

FIGS. 1a, 1b, and 1c show one preferred embodiment of a bar code identification and record assembly 10 configured in accordance with the principles of the present invention. Bar code identification assembly 10 includes carrier element 12 having a first major surface 14 and a second major surface 16. Carrier element 12 is shown in a preferred configuration in which carrier element 12 is card-shaped so that carrier element 12 is readily and conveniently storable in a suitable storage container, such as a card file container or a "Rolodex" style file container. Carrier element is thus preferably formed from any material known to be suitable for forming such a card shaped object, and such materials include, for example, cardboard of the type used to form index cards or plastic material of the type used to form transaction cards. Advantageously, both cardboard and such plastic material are printable so that printed information, bar code information, graphics information, and/or the like can be applied to one or both major surfaces 14 and 16 as desired. Advantageously, such materials are also coatable with a suitable, optional release coating which is applied over first major surface 14 so that bar code patch 20 may be releasably disposed on first major surface 14.

Transponder patch 20 includes bar code 22, shown schematically as a plurality of spaced apart bars, disposed on the top side of support 24. Support 24 can be made from a wide range of materials having any of a desired range of characteristics depending upon the nature of the substrate to which patch 20 is to be adhered. For example, if it is known that patch 20 will be adhered to relatively planar surfaces, such as computer equipment housings, artwork, television housings, packaging boxes, or the like, support 24 can be made from relatively rigid materials such as relatively thick metal sheeting, relatively rigid polymers, ceramic, wood, and the like. On the other hand, if patch 20 is to be readily adhered to nonplanar and/or flexible surfaces, such as piping, animals, human patients, convex and/or concave housings, or the like, then support 24 can be made from a flexible material such as paper, cardboard, relatively flexible polymers, fabric, thin metal sheeting, and the like. In other applications in which patch 20 is to be adhered to irregularly shaped items, then it may be desirable to form support 24 from an elastic polymeric material.

Adhesive coating 28 is disposed on the bottom side of support 24 and allows patch 20 to be adhered to a desired code recipient after patch 20 is removed from carrier element 12. In applications in which patch 20 is intended to have a long service life, adhesive coating 28 preferably comprises an adhesive which allows patch 20 to be adhered to a desired code recipient with an aggressive, long-lasting bond so that patch 20 is difficult to remove after being adhered to a desired substrate. For example, a pressure sensitive adhesive similar to the type of adhesive used on the bandaging material referred to as "mole skin" and/or to the type of adhesive used on duct tape, or the like, would be suitable in the practice of the present invention. In applications in which the code recipient may be exposed to humidity, aquatic environments, or other moisture, it would be desired that adhesive coating 28 comprises an adhesive which is water-resistant and/or waterproof. In applications in which patch 20 is intended to be only in temporary use, e.g., if patch 20 is to be adhered to a patient during a hospital stay, then adhesive coating 28 desirably comprises a less aggressive adhesive, such as one of the types of adhesives used on conventional bandaging materials, so that patch 20 can be removed from the patient without undue discomfort when desired.

Although patch 20 is shown with a generally rectangular shape with bar code image 22 in a centered position, patch 20 can be provided with other configurations if desired. For example, patch 20 could be square-shaped, elliptically-shaped, circularly-shaped, or irregularly-shaped. Additionally, depending upon the character of the corresponding code recipient, transponder 22 could be disposed in an off-centered position as well.

Bar code image 22 includes information comprising data representative of an individual identification code. For purposes of illustration, the identification code associated with bar code image 22 of the Figures is the alphanumeric "1010101010". However, this particular code is only intended to be representative of one type of identification code useful in the practice of the present invention, and other coding approaches could be used.

Figure 6:
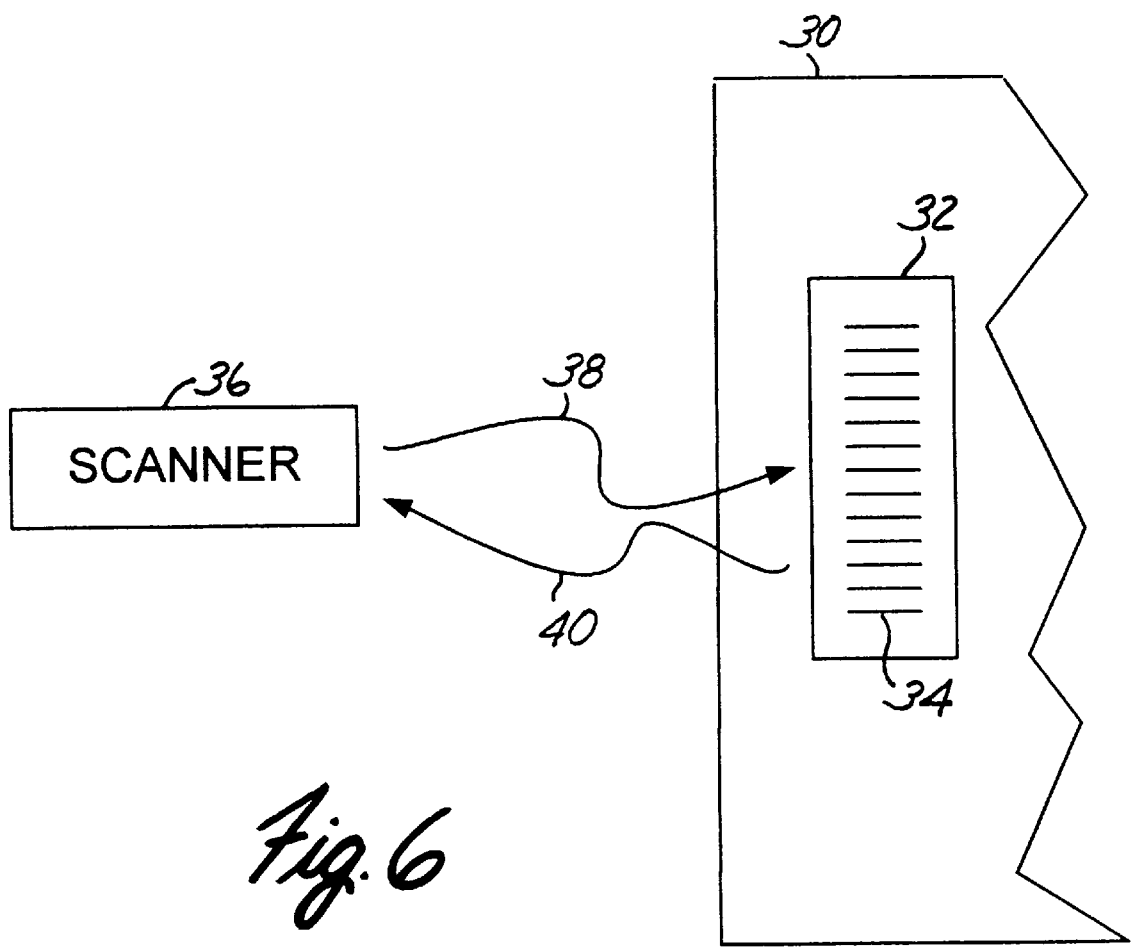
FIG. 6 is a schematic illustration of a bar code scanner interrogating a bar code patch of the present invention.

The identification code stored in the bar code image 22 becomes associated with a particular code recipient when patch 20 is adhered to that code recipient. Thereafter, the bar code image 22 can be remotely read using an interrogator unit in order to determine the identification code previously associated with the code recipient. This procedure is schematically shown in FIG. 6. Referring to FIG. 6, a code recipient 30 carries patch 32 containing a bar code image 34. In order to determine information comprising the identification code stored in bar code image 34 and associated with the code recipient 30, bar code scanner 36 transmits an interrogation signal 38 to bar code image 34. Response signal 40 is transmitted back to the interrogation unit 36. Response signal 40 has encoded therein information corresponding to the identification code associated with bar code image 34. Hence, by interrogating bar code image 34, the identification code associated with code recipient 30, which could be a person, animal, or object, is easily determined.

Referring again to FIGS. 1a, 1b, and 1c, visually observable, human-readable data is disposed on carrier element 12, and this visually observable data comprises a copy 52 of the identification code "1010101010" stored in the bar code image 22. In the particular embodiment shown in these Figures, copy 52 is in the form of pre-printed information disposed on first major surface 14 of carrier element 12. Because printing materials do not adhere well to a release coating, copy 52 and any other visually observable data disposed on the first major surface 14 is generally pre-printed onto first major surface 14 before the release coating is applied.

For illustrative purposes, additional pre-printed information optionally disposed on first major surface 14 includes the letter "T" which represents, for example, a trademark which can be applied to carrier element 12 as desired to represent the entity who manufactures and sells assembly 10, the customer who purchases assembly 10, or the like. Of course, the present invention does not require that the additional pre-printed information be included at all or that such information, if present, includes a trademark. Indeed, any kind of additional pre-printed information could be included on carrier element 12 which might convey information of practical use or of interest to the user of assembly 10.

As another preferred feature of the present invention, carrier element 12 includes writeable portion 54 which is disposed on second major surface 16 of carrier element 12 so that one or more users of assembly 10 can add descriptive information to carrier element 12 which relates to the corresponding code recipient. For purposes of illustration, for example, writeable portion 54 includes the hand-written terminology "Computer Monitor No. A-1111" which has been written onto writeable portion 54 in order to indicate that patch 20 is or will be adhered to an item of computer equipment designated as "Computer Monitor No. A-1111". Similarly, the information "John Doe" and "Building 111-1N-11" have been written onto writeable portion 54 in order to identify the person and location associated with "Computer Monitor No. A-1111". Because it is generally difficult to apply written information to release coatings with any permanency, writeable portion 54 is advantageously disposed on second major surface 16 which, unlike first major surface 14, does not include an optional release coating.

Advantageously, after patch 20 is removed from carrier element 12 and applied to the code recipient, carrier element 12 can be separately stored from the code recipient bearing patch 20 to provide a tangible, separate record of the identification code and descriptive information associated with the code recipient. Such separate records are particularly useful for security purposes, calamity purposes, inventory purposes, health care purposes, and the like in the event that the code recipient is moved, stolen, damaged, needs care, and/or is modified.

Figure 2:
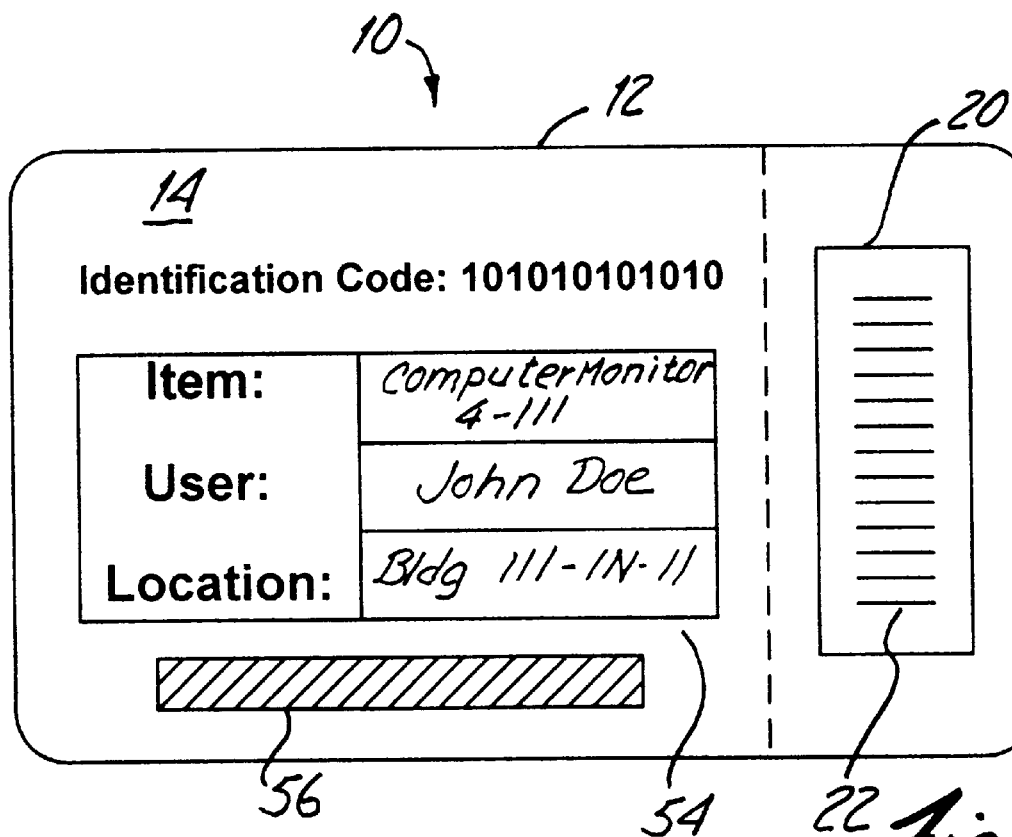
FIG. 2 shows an alternative embodiment of a top plan view of a transponder identification and record assembly of the present invention.

FIG. 2 shows an alternative embodiment 10 of the present invention which is similar to the embodiment 10 of FIGS. 1a, 1b, and 1c in all but three respects. Firstly, the release coating of FIG. 2, if any, overlies only a portion (bounded by the dotted line) of first major surface 14 proximal to and underlying patch 20. In this way, writeable portion 54 is disposed on first major surface 14 rather than the second major surface (not shown) of carrier element 12. As a third difference, an additional copy 56 of the identification code is disposed on carrier element 12 in machine readable form, e.g., magnetically stored in another bar code image or in a magnetic or optical recording medium disposed in or on carrier element 12 analogous to the memory storage elements used on transaction cards. Machine readable copy 56 helps with data entry in those instances in which information records for a number of identification codes and code recipients are to be entered into and stored in a computer database.

Figure 3A:
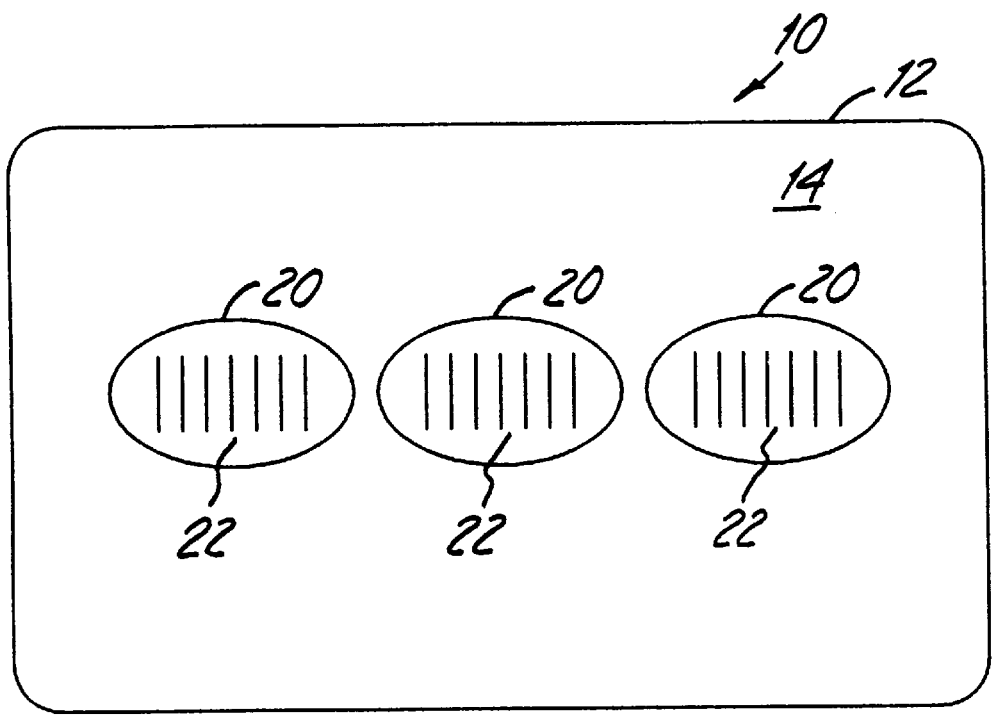
FIG. 3a is a top plan view of an alternative embodiment of the invention in which a plurality of patches are disposed on a carrier element.
Figure 3B:
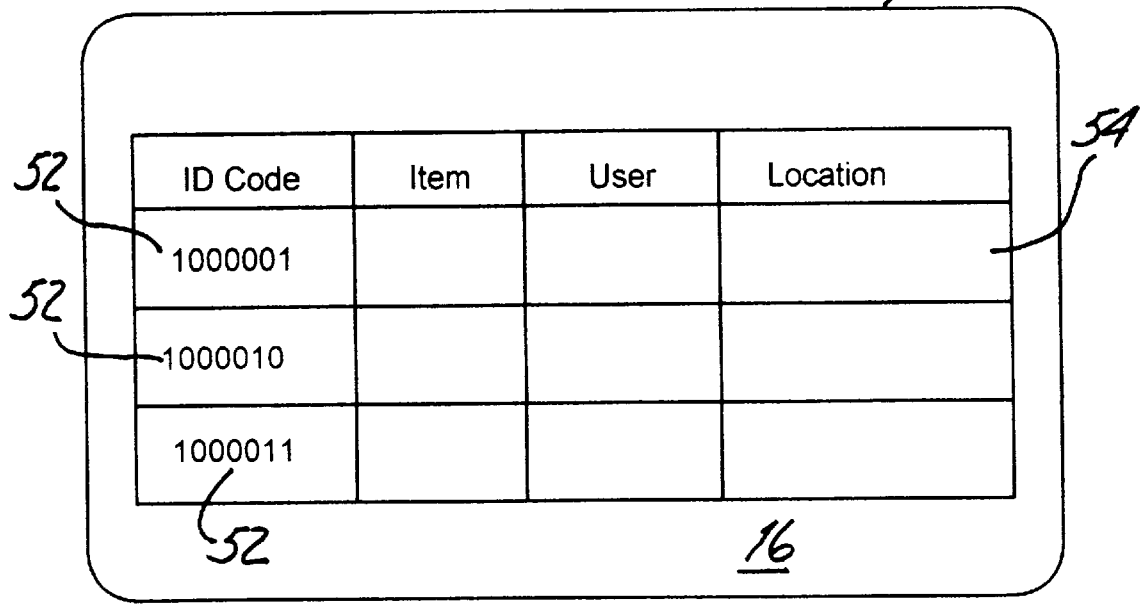

Another embodiment of a transponder identification and record assembly 10 of the present invention is shown in FIGS. 3a and 3b. This embodiment is similar to the embodiment of FIGS. 1a, 1b, and 1c with two exceptions. First, a plurality of patches 20 are disposed on the first major surface 14, and data comprising copies of the corresponding identifications codes is provided on the second major surface 16. As a second difference, whereas patch 20 of FIGS. 1a, 1b, and 1c is rectangular shaped, the patches 20 of FIG. 3a are circularly shaped.

Another embodiment of a transponder identification and record assembly 10 of the present invention is shown in FIG. 4. Assembly 10 of FIG. 4 is similar to assembly 10 of FIGS. 1a, 1b, and 1c except that assembly 10 of FIG. 4 includes notches 58 to facilitate storage of carrier element 12 in a "Rolodex" style storage container after patch 20 is removed and adhered to a substrate.

FIG. 5 shows another embodiment of a transponder identification and record assembly 10 of the present invention similar to assembly 10 of FIGS. 1a, 1b, and 1c except that carrier element 12 of assembly 10 includes a detachable coupon portion 60 coupled to the remainder of carrier element 12 along perforation line 62. Detachable coupon portion 60 includes printed information including another copy of the identification code, a writeable portion 64 on which information relating to the substrate and user can be provided, and details comprising a mailing address to which the coupon portion 60 can be mailed after detachment so that information records for the identification code and the substrate/user information can be entered into and stored in a remote, centralized computer database in which a plurality of such records are stored. That is, the database would include a plurality of records containing data representative of a plurality of identification codes and data representative of the code recipient information correspondingly associated with the plurality of identification codes.

The reverse side of coupon portion 60 could have printed information on it as well. For example, such reverse side could be pre-printed like a postcard with an addressee name, address, postage, and the like.

Advantageously, such a database and the records stored in the database would help in the process of returning the lost or stolen property to the owner or other rightful custodian in the event that such property were to be recovered by a third party after being lost or stolen. For example, according to one representative use of the present invention which is for home security applications, a property owner may desire to apply identification information to a variety of items such as stereo equipment, computer equipment, televisions, bicycles, and the like. If so, the property owner could obtain one or more bar code identification and record assemblies containing enough patches 20 to adhere to all such items.

For each item, one or more patches 20 would be removed from their carrier elements 12 and then adhered to the item. The property owner preferably would also describe the marked item on the writeable portion 54 of the carrier element 12. Carrier element 12 could then be stored in a separate location for record purposes. Additionally, the property owner can take action to ensure that the information is also inputted into a centralized, computer database. This could be accomplished in a variety of ways such as by contacting the database service provider by phone, internet, other network means, or by mailing a coupon portion such as coupon portion 60 in the event assembly 10 is of the type including such a coupon.

Thus, if property bearing a patch 20 were ever lost and then recovered by a third party, the third party could interrogate patch 20 adhered to the property and obtain information comprising the identification code associated with the property and preferably a phone number or other such information for accessing the database or for contacting personnel who have authority to access the database. The identification code obtained from the property could then be used to access the property record of the database corresponding to that identification code. In preferred embodiments of the present invention in which such record comprises information relating to the owner of the property, such information could then be used to return the property to the owner.

The ease with which patches can be adhered to various items and with which carrier elements can be subsequently stored makes the present invention particularly efficient for rapidly developing unique identification records for a large number of items. Consequently, the present invention is also extremely well suited for developing records for business security purposes. For example, to help protect valuable business properties, such as artwork, computer equipment, and the like, such items could be marked with patches in accordance with the present invention. A written description of each item, its designated user if any, and designated location could be provided on the corresponding carrier element after which the carrier element can be stored in a safe location. Additionally, it is also extremely desirable to input the identification code and description of each item as one or more records in a computerized database. With patches appropriately applied to such items, bar code scanners could be placed at exits or other convenient check points leading into and out of designated areas in order to monitor the passage of marked items. If the bar code of an item is scanned, then the identification code for the detected item can be used to access the carrier element record and/or the computer database record corresponding to the identification code. The record can then be reviewed to determine if transport for the item is authorized or not. Appropriate action could then be taken to recover the item if transport is not authorized.

Advantageously, this procedure can be fully automated. For example, the database records of the marked items can include a data field indicating whether transport for an item during a particular time period and through particular passageways, if desired, is authorized or not. Then, when the bar code is scanned, security programming can automatically access the record to determine the authorization status for the item. If transport is not authorized, doors would remain closed and optionally an alarm could be triggered at an appropriate security location. Security is enhanced if bar code surveillance is used in combination with video surveillance so that a video record of the person transporting an item without authorization could also be obtained.

The present invention is also particularly suitable for animal identification and record keeping applications. For example, a patch of the present invention could be adhered directly to an animal or to an item, such as a collar or tag, worn by the animal. Information relating to the animal, such as health care information, feeding instructions, vaccination information, and the like, could then be entered onto the corresponding carrier element and/or into a corresponding computerized database record(s) for the animal. Such record(s) are easily accessed and updated, as desired, by scanning the bar code incorporated into the patch in order to obtain the animal's unique identification code.

The present invention is also particularly suitable for human patient identification and record keeping applications. For example, a patch of the present invention could be removed from its carrier element and then adhered directly to a patient or to an item worn by the patient when the patient enters a health care facility for treatment. Information relating to the patient, such as history, treatment records, diagnosis, prescriptions, scheduling, or the like could then be entered onto the corresponding carrier element and/or into a corresponding computerized data base record(s) for the patient. Such record(s) are easily accessed and updated, as desired, by scanning the bar code image incorporated into the patch in order to obtain the patient's unique identification code. Advantageously, determining the patient's identification code and inputting such a code into a database in order to obtain the patient(s) records can be fully automated. As a result, manual determination and entry of patient identification codes is not required, thus minimizing the chances that an erroneous code could be used to obtain the wrong health care record.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A bar code identification and record assembly suitable for associating an identification code with a code recipient and for maintaining an independent record of the identification code associated with the code recipient, comprising:

a carrier element;

a patch releasably disposed on the carrier element before being adhered to the code recipient, wherein the patch is provided with an adhesive coating such that the patch is adherable to the code recipient after the patch is removed from the carrier element, wherein the patch comprises a bar code image which stores information comprising the identification code, and wherein the bar code image can be remotely interrogated to obtain the identification code; and a data record disposed on the carrier element separate from the patch such that the data record is retained on at least a portion of the carrier element after the patch is removed from the carrier element, said data record including information which comprises a copy of the identification code such that, after the patch is removed from the carrier element and adhered to the code recipient, at least the portion of the carrier element bearing said data record can be separately stored from the code recipient bearing the patch to provide a tangible, separate record of the identification code associated with the code recipient.

2. The assembly of claim 1, wherein the data record is data printed onto the carrier element.

3. The assembly of claim 2, wherein the carrier element comprises first and second major opposed surfaces, wherein the patch is releasably disposed on the first major surface of the carrier element, and wherein at least a portion of the data record is disposed on the second major surface of the carrier element.

4. The assembly of claim 2, wherein the carrier element comprises first and second major opposed surfaces, and wherein the patch is releasably disposed on the first major surface of the carrier element, and wherein at least a portion of the data record is also disposed on the first major surface of the carrier element.

5. The assembly of claim 1, wherein the assembly further comprises a detachable coupon portion removably connected to the carrier element, and wherein the coupon portion comprises a copy of the identification code.

6. The assembly of claim 5, wherein the coupon portion includes a writeable portion on which information relating to the code recipient can be provided.

7. The assembly of claim 1, wherein the data record further comprises substantive information relating to the code recipient associated with the identification code.

8. The assembly of claim 7, wherein the carrier element comprises a writeable portion so that the substantive information can be provided on the carrier element by a user.

9. The assembly of claim 1, wherein a copy of the identification code is incorporated into said carrier element in a machine readable format.

10. The assembly of claim 1, wherein the patch comprises
    a support comprising first and second major opposed surfaces, wherein the bar code image is disposed on the first major opposed surface of the support; and
    an adhesive layer disposed on the second major opposed surface of the support for adhering the patch to the code recipient.

11. The assembly of claim 1, further comprising a computerized database comprising a plurality of code recipient records stored in the database, wherein said records correspond to a plurality of code recipients, each of said code recipients being associated with a particular identification code such that the particular identification code can be used to access the code recipient record of the corresponding code recipient.

12. The assembly of claim 11, wherein the plurality of the code recipient records each comprise data representative of whether transport of the corresponding code recipient is authorized, and wherein the assembly further comprises an interrogation unit disposed in a position effective for detecting transport of a code recipient past the interrogation unit.

13. The assembly of claim 12, further comprising an alarm operationally coupled to the interrogation unit such that the alarm is triggered when the interrogation unit detects an unauthorized transport of a code recipient.

14. The assembly of claim 12, further comprising a video recording apparatus operationally coupled to the interrogation unit such that the video recording apparatus is operated to record the unauthorized transport of a code recipient past the interrogation unit.

15. The assembly of claim 1, wherein the code recipient is a human.

16. The assembly of claim 1, wherein the code recipient is an animal.

17. The assembly of claim 1, wherein the code recipient is an object.

18. A method of providing a system suitable for associating an identification code with a code recipient and maintaining an independent record of the identification code associated with the code recipient, comprising the steps of:
  (a) providing an identification system comprising
    (i) a carrier element;
    (ii) a patch releasably disposed on the carrier element before being adhered to the code recipient, wherein the patch is provided with an adhesive coating such that the patch is adherable to the code recipient after the patch is removed from the carrier element, wherein the patch comprises a bar code image which stores information comprising the identification code, and wherein the bar code image can be remotely interrogated to obtain the identification code; and
    (iii) a data record disposed on the carrier element separate from the patch such that the data record is retained on at least a portion of the carrier element after the patch is removed from the carrier element, said data record including information which comprises a copy of the identification code such that, after the patch is removed from the carrier element and adhered to the code recipient, the carrier element bearing said data record can be separately stored from the code recipient bearing the patch to provide a tangible, separate record of the identification code associated with the code recipient;
  (b) removing the patch from the carrier element;
  (c) adhering the patch to the code recipient, and
  (d) storing the carrier element in a location separate from the code recipient to thereby provide a separate record of the identification code associated with the code recipient.

19. The method of claim 18, wherein the data record is in the form of human-readable, printed information provided on the carrier element.

20. The method of claim 19, wherein the carrier element comprises first and second major opposed surfaces, wherein the patch is releasably disposed on the first major surface of the carrier element, and wherein at least a portion of the data record is disposed on the second major surface of the carrier element.

21. The method of claim 19, wherein the carrier element comprises first and second major opposed surfaces, and wherein the patch is releasably disposed on the first major surface of the carrier element, and wherein at least a portion of the data record is also disposed on the first major surface of the carrier element.

22. The method of claim 18, wherein the assembly further comprises a detachable coupon portion removably connected to the carrier element, and wherein the coupon portion comprises a copy of the identification code either before or after the coupon portion is removed from the carrier element.

23. The method of claim 22, wherein the coupon portion includes a writeable portion on which information relating to the code recipient can be provided.

24. The method of claim 18, wherein the data record further comprises substantive information relating to the code recipient associated with the identification code.

25. The method of claim 24, wherein the carrier element comprises a writeable portion so that the substantive information can be provided on the carrier element by a user.

26. The method of claim 18, wherein a copy of the identification code provided on the patch is also incorporated into said carrier element in a machine readable format.

27. The method of claim 18, further comprising the step of inputting a code recipient record for the code recipient into a computerized database, wherein the database comprises a plurality of code recipient records stored in the database, wherein said records correspond to a plurality of code recipients, each of said code recipients being associated with a particular identification code such that the particular identification code can be used to access the code recipient record of the corresponding code recipient.

28. The method of claim 27, wherein the plurality of the code recipient records each comprise data representative of whether transport of the corresponding code recipient is authorized, and wherein the method further comprises interrogating at least one of the code recipients to determine whether transport of said at least one code recipient is authorized.

29. The method of claim 28, further comprising the step of triggering an alarm when the interrogation unit detects an unauthorized transport of said at least one code recipient.

30. The method of claim 28, further comprising using video surveillance to record video information relating to the unauthorized transport of said at least one code recipient.

31. The method of claim 18, wherein the code recipient is a human.

32. The method of claim 18, wherein the code recipient is an animal.

33. The method of claim 18, wherein the code recipient is an object.

34. A method of providing a centralized system suitable for associating a plurality of identification codes with a plurality of corresponding code recipients and maintaining a record of which identification code is associated with each code recipient, comprising the steps of:

(a) providing an identification system comprising a carrier element;
  (i) a patch releasably disposed on the carrier element before being adhered to the code recipient, wherein the patch is provided with an adhesive coating such that the patch is adherable to the code recipient after the patch is removed from the carrier element, wherein the patch comprises a bar code image which stores information comprising the identification code, and wherein the bar code image can be remotely interrogated to obtain the identification code; and
  (ii) a data record disposed on the carrier element separate from the patch such that the data record is retained on at least a portion of the carrier element after the patch is removed from the carrier element, said data record including information which comprises a copy of the identification code such that, after the patch is removed from the carrier element and adhered to the code recipient, the carrier element bearing said data record can be separately stored from the code recipient bearing the patch to provide a tangible, separate record of the identification code associated with the code recipient;

(b) removing the patch from the carrier element;
(c) adhering the patch to the code recipient; and
(d) inputting a code recipient record into the database in a manner such that the identification code can be used to access said record.

35. The method of claim 34, further comprising repeating steps (a) through (d) for at least one additional identification code and at least one additional code recipient to be associated with the at least one additional identification code.

36. The method of claim 34, further comprising determining the identification code for a code recipient by interrogating the code recipient and using the identification code to access the corresponding code recipient record.

37. The method of claim 34, wherein the database comprises a plurality of code recipient records stored in the database, wherein said records correspond to a plurality of code recipients, each of said code recipients being associated with a particular identification code such that the particular identification code can be used to access the code recipient record of the corresponding code recipient.

38. The method of claim 37, wherein the plurality of the code recipient records each comprise data representative of whether transport of the corresponding code recipient is authorized, and wherein the method further comprises interrogating at least one of the code recipients to determine whether transport of said at least one code recipient is authorized.

39. The method of claim 38, further comprising the step of triggering an alarm when the interrogation detects an unauthorized transport of said at least one code recipient.

40. The method of claim 39, further comprising using video surveillance to record video information relating to the transport of said at least one code recipient.

41. The method of claim 34, wherein the code recipient is a human.

42. The method of claim 34, wherein the code recipient is an animal.

43. The method of claim 34, wherein the code recipient is an object.

* * * * *